Feb. 8, 1949.  F. W. SCHWINN  2,461,003
TRUSS ROD BRACKET
Filed May 14, 1945  2 Sheets-Sheet 1
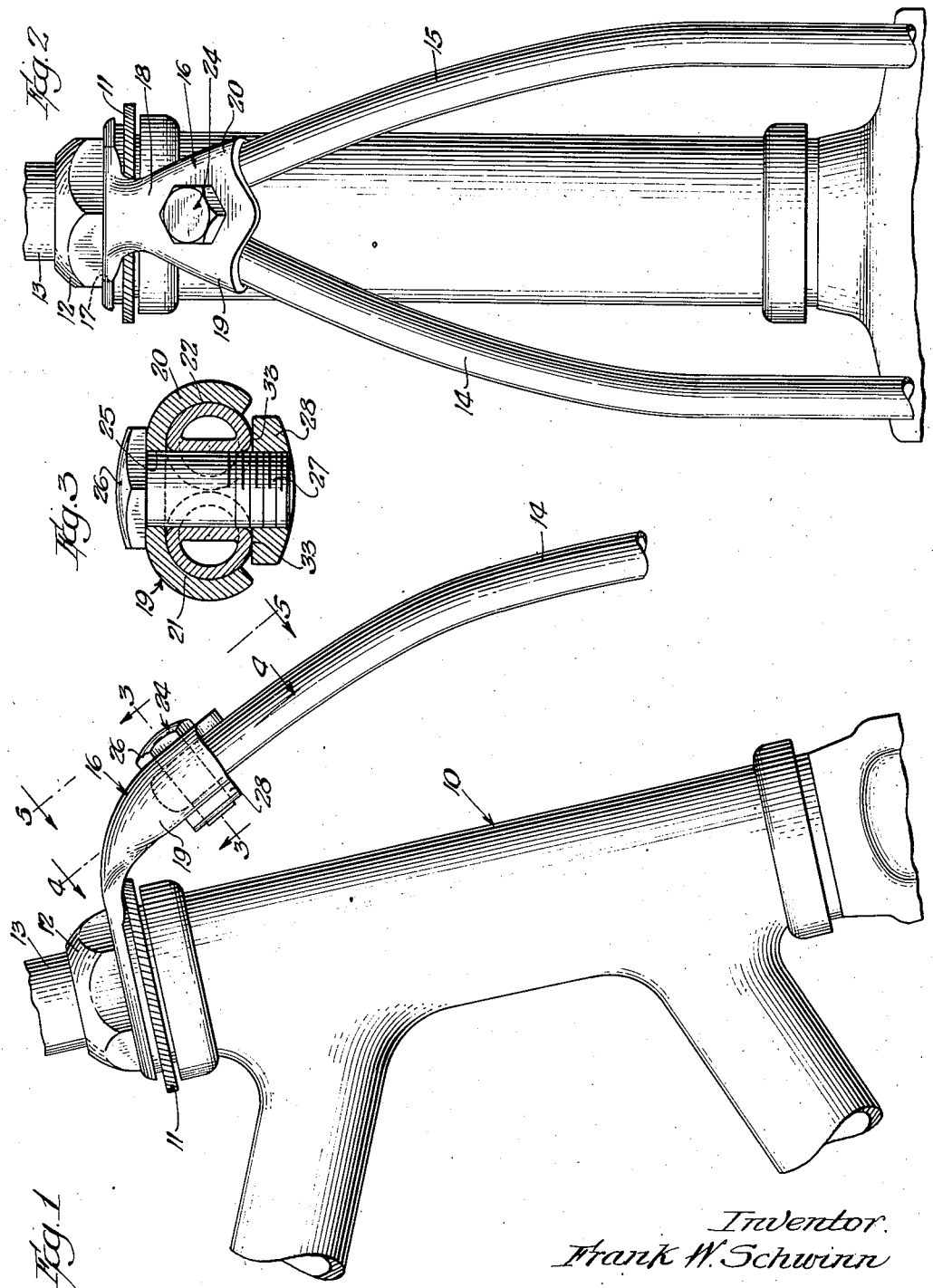
Inventor.
Frank W. Schwinn
By McCaleb, Hendy & Dickinson
Attys.

Feb. 8, 1949. F. W. SCHWINN 2,461,003
TRUSS ROD BRACKET
Filed May 14, 1945 2 Sheets-Sheet 2
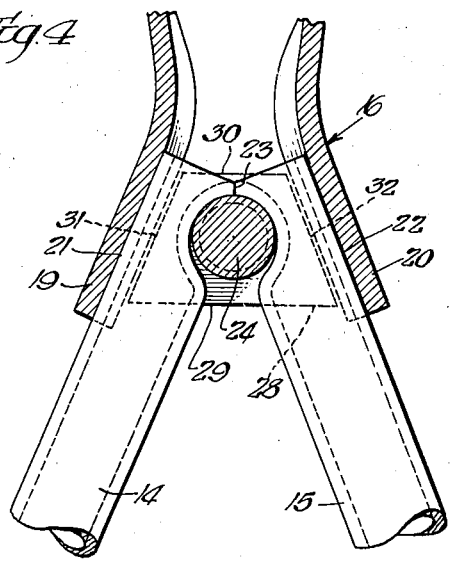
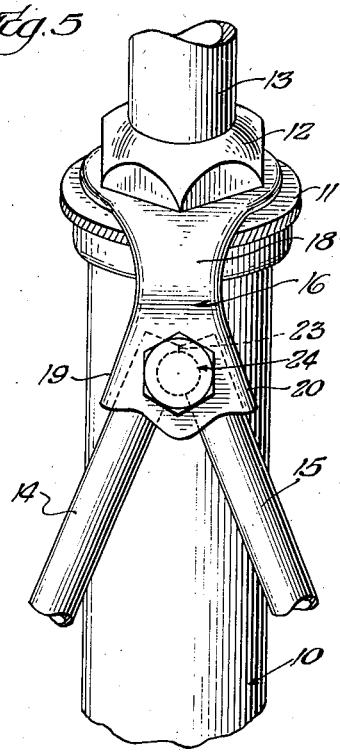
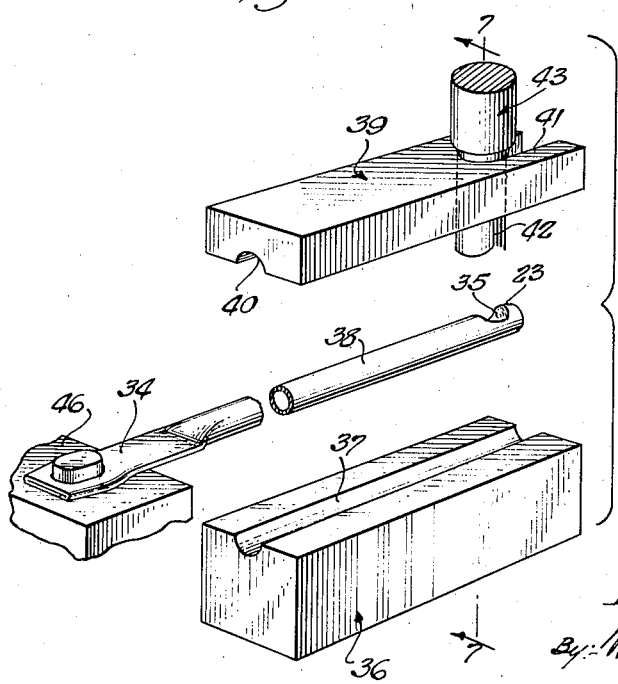
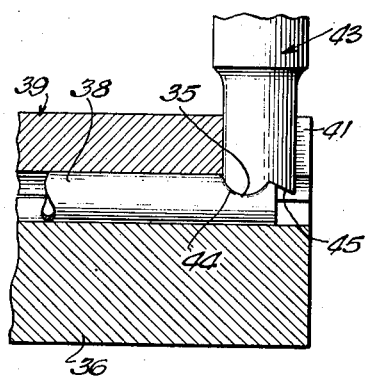
Inventor
Frank W. Schwinn
By McCaleb, Obend & Dickinson
Attys.

Patented Feb. 8, 1949

2,461,003

UNITED STATES PATENT OFFICE 2,461,003

TRUSS ROD BRACKET

Frank W. Schwinn, Chicago, Ill.

Application May 14, 1945, Serial No. 593,565

1 Claim. (Cl. 287—54)

The present invention relates to truss rod brackets and methods of making the same, and is particularly concerned with improved truss rod brackets for bicycles.

The present invention relates to an improvement over the structures and methods disclosed in my prior application Serial No. 510,876, filed November 19, 1943, Patent No. 2,384,968, issued September 18, 1945.

In order that the front steering post column and front fork may be suitably braced by the truss rods which are employed for this purpose, it is necessary that the upper ends of the truss rods be secured together and to the shaft of the front fork in such manner that the rods are adapted to be placed under tension whenever there is a force exerted on the front fork tending to bend it backward. The truss rods are also preferably so arranged that they resist torsional forces exerted on the front fork as may be the case when the front wheel is turning and the front wheel strikes an obstruction at the same time.

According to the structure disclosed in my prior application, the truss rods are secured in substantially parallel relation at their upper ends and below the upper ends the truss rods are bent outwardly. According to the present invention the truss rods are both curved inwardly and secured at their upper ends in diverging relation and in contacting relation to each other and to the bracket and securing means, the securing means being considerably simplified over the devices shown in my prior patent.

One of the objects of the present invention is the provision of an improved truss bracket and truss rod assembly in which the assembly is greatly strengthened over the prior art by virtue of the fact that the rods are secured in diverging relation to each other at the bracket and in such manner that the ends of the rods engage each other to effect a bracing action.

Another object of the invention is the provision of an improved truss rod bracket which is more simple than the devices of the prior art and which may be applicable to various different types of steering shafts.

Another object of the invention is the provision of an improved form of truss rod and truss rod assembly and a simplified type of threaded member which, however, accomplishes the function of securing the trust rods practically as well as in the devices of my prior patent.

Another object of the invention is the provision of an improved method of making truss rods by means of which the rods are simultaneously provided with transversely extended partially cylindrical grooves and with a diagonally extending plane contacting surface by means of which the two truss rods engage each other.

Other objects and advantages of the invention will be apparent from the following description and the accompanying drawings, in which similar characters of reference indicate similar parts throughout the several views.

Refering to the drawings of which there are two sheets,

Fig. 1 is a fragmentary side elevational view of a portion of a bicycle frame provided with a truss rod bracket and truss rods embodying the invention;

Fig. 2 is a fragmentary front elevational view of the structure of Fig. 1;

Fig. 3 is a transverse sectional view taken on the plane of the line 3—3 of Fig. 1 looking in the direction of the arrows;

Fig. 4 is a fragmentary sectional view taken on the plane of the line 4—4 of Fig. 1, looking in the direction of the arrows;

Fig. 5 is a fragmentary top plan view of that portion of the bracket which holds the truss rods, the balance of the structure being shown in perspective;

Fig. 6 is an exploded view showing the upper and lower dies which are used to shape the truss rods; and Fig. 7 is a sectional view taken on the plane of the line 7—7 of Fig. 6 looking in the direction of the arrows.

Referring to Fig. 1, 10 indicates in its entirety the bicycle frame of which only such parts are shown as cooperate with the new truss tube bracket which forms the subject of the present invention. This truss tube bracket is usually secured between the head adjusting cup 11 and the nut 12 on the steering column tube 13 of the bicycle.

The truss tube bracket is shown in connection with truss tubes 14, 15 and the bracket is indicated by the numeral 16. The bracket 16 is provided with a bore 17 for receiving the tubular portion of the head adjusting cup and the upper body portion of the bracket surrounding the bore 17 may be substantially circular. From the body portion of the bracket, the securing flange portion 18 is curved forwardly and downward and is provided on each side with a pair of rearwardly extending reenforcing flanges 19 and 20 and the reenforcing flanges 19 and 20 are partially cylindrical in curvature so as to engage the outside cylindrical surfaces 21, 22 of the truss rods 14, 15.

The partially cylindrical flange portions 19 and 20 increase in width as they extend downwardly from the body portion of the bracket and they also diverge so as to hold the upper ends of the truss rods 14 and 15 in diverging position. The space between these cylindrical portions 19 and 20 is preferably such, and the length of the truss rods 14 and 15 is preferably such, that the truss rods contact each other at the plane end portions 23 of each truss rod above the bolt 24.

The downwardly turned securing flange portion 18 is provided with a bore 25 between the cylindrical flanges 19 and 20 for receiving the screw bolt 24 which has a non-circular head 26 on its upper end and the threaded end portion 27 is provided with a special nut 28.

The nut 28 may be substantially trapezoidal in shape as shown in Fig. 4, having upper and lower parallel edges 29 and 30 and the sides 31 and 32 of the nut taper upwardly in Fig. 4 so that the nut is adapted to engage well over the crowns 33 of the adjacent truss rod portions. As the truss rods diverge downwardly in Fig. 4, so the nut is also of similar shape and the nut is thus adapted to engage the truss rods uniformly over those portions of the truss rods which are under the nut.

The truss rods are preferably made of tubular metal provided at the lower end with the flattened portion 34 for securement to the front axle bolt and at the upper end each truss rod is provided with a partially cylindrical transverse groove 35 adjacent to the flat engaging surface 23. The two grooves 35 are of sufficient size to receive the bolt 24 when the surfaces 23 contact each other and the truss rod ends are located in the cylindrical portions 19 and 20 of the bracket 16.

Thus the contacting end portions 23 of the rods resist the tendency of the rods to spread and the bolt 24 resists the tendency of the rods to be pulled out of the bracket, while the cylindrical portions 19 and 20 of the bracket hold the grooved portions 35 of the rods snugly against the bolt 24.

Referring now to Figs. 6 and 7, these figures show diagrammatically one form of the dies which may be used for shaping the upper ends of the truss rods so that the grooves 35 and diagonal surfaces 23 are simultaneously formed in each rod. The lower die 36 has a longitudinally extending cylindrical groove 37 of a size adapted to receive and support the tube 38 of which the truss rod is being made.

The upper die 39 is of similar shape and is provided with a downwardly turned groove 40 of similar shape. When the dies engage each other, grooves 37 and 40 snugly embrace the tube 38. At one end, the upper die 39 is provided with a longitudinally extending slot 41 for receiving the lower cylindrical portion 42 of a plunger 43. Plunger 43 has its lower end formed with a transverse cylindrical portion 44 for forming the groove 35 and with a laterally and downwardly extending diagonal plane surface 45 for forming the flat surface 23 on each truss rod.

The operation of the dies is as follows: The die members 36 and 39 are first brought into engagement with the tube 38 of which the truss rod is to be made, to hold the truss rod in proper position, while the flattened end portion 34 of the truss rod tube is engaging a block 46 so that the axis of the groove 35 will be in the proper position. Then the plunger 43 is brought into engagement with the tube 38 and is forced down to such a point that it forms the groove 35 of proper depth and also forms the plane diagonal surface 23 on the truss tube.

It will thus be observed that I have invented an improved form of truss tube and bracket assembly by means of which the truss tubes are held in diverging position against withdrawal or against movement of any kind relative to each other or to the truss tube bracket. The engagement of the end portions of the truss tubes with each other greatly reenforces the action of the cylindrical flanges of the bracket in preventing the spreading of the tubes, and the tubes are also securely anchored against tensional forces which are brought to play upon the truss tubes when the front wheel strikes an obstruction such as, for example, the curb when the rider is endeavoring to ride from the road up on the curb.

The present form of truss tube and bracket assembly is more simple to construct and more economical to manufacture than that shown in my prior patent and yet it is believed to be just as rigid and to have adequate strength for every stress to which it may be subjected.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

A truss tube rod and bracket assembly for connection to the steering tube of a bicycle and comprising a metal bracket provided with a body portion having a centrally located bore at one end for receiving the steering tube, said bracket having a forwardly and downwardly extending truss rod securing flange, said flange being provided on each side with downwardly extending and substantially straight partially cylindrical portions and being provided with a through bore between said partially cylindrical portions, a bolt of a size to fit said through bore, a pair of truss rods each having a substantially straight upper end portion of a length substantially greater than that of said partially cylindrical portions, said end portions of the truss rods being engaged on their outer sides by said partially cylindrical portions of the flange, said truss rods also being provided with transversely extending partially cylindrical grooves provided by deformation of the adjacent side walls thereof for receiving said bolt located in said through bore, said partially cylindrical portions of the securing flange having axes angularly disposed to diverge downwardly for holding said upper end portions of the truss rods in diverging relationship to one another, and a threaded member for engaging the end of said bolt for securing the truss rods to said bracket, said threaded member being substantially trapezoidal in shape so that it extends over the middle portion of each truss rod when the truss rods are disposed in said diverging relationship relative to one another.

FRANK W. SCHWINN.

REFERENCES CITED

The following references are of record in the file of this patent:

UNITED STATES PATENTS

| Number | Name | Date |
| --- | --- | --- |
| 554,465 | Tomlinson | Feb. 11, 1896 |
| 623,495 | Trebert | Apr. 18, 1899 |
| 1,596,393 | Bowne | Aug. 17, 1926 |
| 1,962,543 | Wilson | June 12, 1934 |
| 2,064,539 | Hart | Dec. 15, 1936 |
| 2,384,968 | Schwinn | Sept. 18, 1945 |

FOREIGN PATENTS

| Number | Country | Date |
| --- | --- | --- |
| 296,551 | Great Britain | Sept. 6, 1928 |